United States Patent [19]

Mansnerus

[11] 3,784,924

[45] Jan. 8, 1974

[54] MULTI-INPUT LOOP FILTER WITH INDEPENDENT BANDWIDTH AND RESPONSE CHARACTERISTICS

[75] Inventor: Harlan H. Mansnerus, Newbury Park, Calif.

[73] Assignee: The United States of America as represented by the Secretary of the Navy, Washington, D.C.

[22] Filed: Jan. 31, 1972

[21] Appl. No.: 222,249

[52] U.S. Cl. ................................ 330/30 R, 330/75
[51] Int. Cl. ........................................ H03f 3/68
[58] Field of Search ...................... 330/30 R, 75, 84, 330/69, 124, 108, 147; 333/70 CR

[56] References Cited

UNITED STATES PATENTS 3,453,554 7/1969 Shoemaker ...................... 330/30 R

OTHER PUBLICATIONS

Philbrick/Nexus Research–A Teledyne Co. – "Applications Manual for Operational Amplifiers" – Second Edition, Aug., 1969 – page 44 (II–10)

*Primary Examiner*—Nathan Kaufman
*Attorney*—Richard S. Sciascia and J. M. St. Amend

[57] ABSTRACT

A single loop filter with multiple inputs and separate signal paths for each input using an operational amplifier with feedback capacitor connected in series with one or more damping resistors and having an input resistor associated with each damping resistor; the multiple input resistors achieving more than one bandwidth while the damping resistors maintain a desired damping factor for each input respectively.

2 Claims, 3 Drawing Figures

PATENTED JAN 8 1974 3,784,924

MULTI-INPUT LOOP FILTER WITH INDEPENDENT BANDWIDTH AND RESPONSE CHARACTERISTICS

BACKGROUND OF THE INVENTION

The present invention relates to electronic networks for use in automatic control systems and particularly for selecting the bandwidth of a single loop filter without affecting the damping factor of the filter.

Automatic control systems with various synchronization schemes are employed in a variety of guidance controls, positioning controls, and coherent communications including data transmission and recovery. Depending on the requirements of the particular application and the amount of sophistication necessary, the design of the synchronization circuitry will in general include some kind of active loop filter. Very often the design and performance of the control loop is at best a compromise limited by one or more factors. One of the main factors is the use of a fixed loop bandwidth. If a narrow bandwidth phase lock is necessary then the initial signal acquisition is time consuming and very difficult to achieve under high noise conditions. If a wider bandwidth is used as a compromise, then signal retention is difficult in the presence of noise and the quality of the information due to phase jitter is impaired. The purpose of the present invention is to remove this compromise and allow the use of separate bandwidths to satisfy separate conditions of synchronization. It is possible to achieve this goal by other methods which are complicated by the use of additional switching in the feedback path of the active loop filter.

A conventional active loop filter used to control voltage-controlled-oscillators where it is desirable to synchronize the voltage-controlled-oscillator to the frequency and phase of an incoming signal is shown in FIG. 1. The phase lock bandwidth is a function of resistor $R_1$ and capacitor C while the response characteristics of the closed loop are a function of resistor $R_2$ and the phase lock bandwidth. Once the phase lock bandwidth is determined then resistor $R_2$ can be independently adjusted to establish the damping factor (which in turn determines the response characteristics).

Synchronization capability can be enhanced if the phase lock bandwidth can be automatically changed to accommodate either the acquisition or retention state of synchronization. To change the bandwidth it would be necessary to switch resistor $R_1$, however this would also change the damping factor. Thus, resistor $R_2$ would need to be switched also, which would necessitate the use of additional components. Furthermore, experience has shown that switches in the feedback path of an amplifier are not desirable.

However, the present invention with its simplicity of design lowers the cost, allows the circuit to be produced in integrated form, and increases the performance and reliability of the overall system.

SUMMARY OF THE INVENTION

The present invention relates to a means for establishing a plurality of bandwidths for a single loop filter while maintaining the correct response characteristics associated with each input to the filter. The filter also has the ability to operate under multiple signal control where there is more than one error signal. This is accomplished by splitting the feedback resistor of the filter loop into several separate resistors and providing a separate input resistor for each segment of the feedback resistor, so that with each input is associated a different bandwidth and a corresponding damping factor. This arrangement allows independent loop filter bandwidths to be obtained by selecting only the appropriate input point. The need for switching circuit components in the amplifier feedback path becomes unnecessary. The invention makes possible a multiple bandwidth active loop filter with optimum loop response characteristics. This type of filter permits a new type of synchronization capability for phase lock loop systems.

Other objects, advantages and novel features of the invention will become apparent from the following detailed description of the invention when considered in conjunction with the accompanying drawings wherein.

DESCRIPTION OF THE PREFERRED EMBODIMENTS

Figure 1:
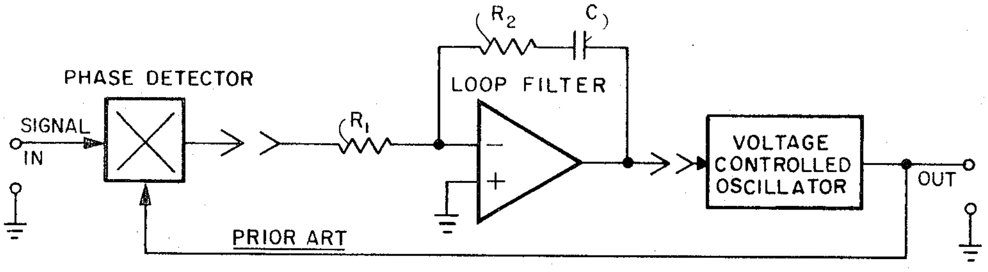
FIG. 1 is a schematic diagram of a convention basic loop with standard filter.
Figure 2:
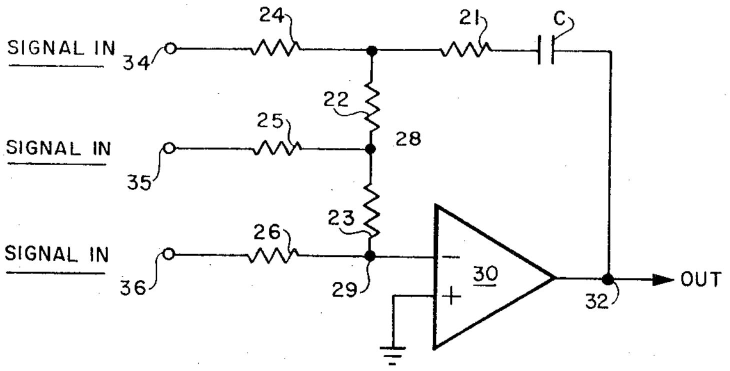
FIG. 2 is a schematic diagram of a preferred embodiment of the present invention for a multi-input loop filter with independent damping characteristics.

A basic phase lock loop is shown in FIG. 1. Primarily, resistor $R_1$ affects the bandwidth while resistor $R_2$ affects the damping factor and capacitor C affects both bandwidth and damping factor. For the purpose of discussion, other parameters of the system which also affect the bandwidth and damping factor are disregarded. Prior circuits have dealt primarily with the manipulation of resistor $R_1$ whether it was done with a triode, diode or some other means and was not related to the damping factor problem. The present invention deals more specifically with the function of resistor $R_2$. The usual low-pass loop filter, as shown in FIG. 1, contains a "damping" resistor $R_2$. If resistor $R_2$ is subdivided into more than one resistor, such as resistors 21, 22 and 23 as shown in FIG. 2, then more than one input resistor, such as resistors 24, 25 and 26 can be used for the purpose of achieving more than one bandwidth while maintaining the proper damping factor for each bandwidth. The additional input resistors 25 and 26 are connected to points 28 and 29 in the feedback subdivision which will tend to function as input summing junctions of the amplifier 30. The damping resistance associated with any one input involves only those resistors of the feedback path which are between that input and the amplifier output 32. The remaining resistor or resistors of the feedback path between that input and the main summing junction 29 of amplifier 30 are not involved. However, the order in which the damping resistor values are determined deserves some consideration becase the total damping resistance for inputs 35 and 36 includes more than one resistor. Therefore, the value for resistor 21 should be chosen first, followed by resistors 22 and 23 respectively. If only one input resistor is connected at a time then the damping resistance associated with any one input involves only resistors 21, 22 or 23. If however, more than one input is connected at a time then the total damping resistance associated with a particular input might involve one or more input resistors as well. For example, if input 34 is connected then the total damping resistance for input 35 becomes a function of resistors 21, 22 and input resistor 24. In most cases the values of the input resistors 24, 25 and 26 are large compared to the damping resistors 21, 22 and 23, thus causing this effect to be negligible.

Although the circuit as shown in FIG. 2 implies the use of separate signal sources to drive points or inputs 34, 35 and 36, it would be possible to drive these points from a single source by means of switches. This could be done to obtain several bandwidths and/or damping factors for a given input signal.

This loop filter has the ability to operate under multiple loop control where there is more than one error signal. Different error voltages can appear at the different inputs 34, 35 and 36 while at the same time the damping factors (resistors) for each control loop are independently selectable. Due to the arrangement of the damping resistors 21, 22 and 23 as incorporated with the input resistors 24, 25 and 26, the damping factors involving these resistors need not be the same. The most important consideration therefore is that the damping factor(s) can be optimized for a great many conditions.

For illustration purposes only those components for three bandwidths are shown. Additional bandwidths may be added in a simple extension of the basic idea by providing additional input resistors and damping resistors as desired.

The most important new feature of this invention is that the independent loop filter bandwidths can be obtained by selecting the appropriate input point, and this is made possible by the fact that the damping resistors are arranged in a manner which causes no interaction. To accomplish the same task by the old method would necessitate disconnecting the amplifier feedback path to insert a different damping resistor each time the loop bandwidth was changed. The added complexity, inferior performance and cost of the older method discourages its use.

The advantages of this invention are most clearly apparent when examining the problems and objectives of loop control systems. This type of system can be optimized for the various states of synchronization if the phase lock bandwidth is flexible. The invention allows maximum flexibility to be achieved with a low cost design, and the simplicity of design allows the circuit to be produced in integrated form and also increases the reliability of the overall system.

A flexible loop filter of this type finds wide application in systems where the loop bandwidth and/or damping factor is automatically adjusted to optimize some parameter such as tracking error, phase error or signal-to-noise ratio.

Figure 3:
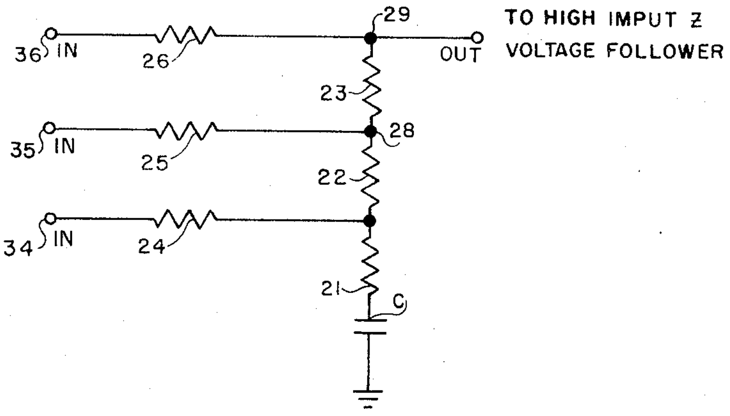
FIG. 3 shows an alternate embodiment which is a passive version of the circuit of FIG. 2 without the amplifier.

An alternative method of construction is the passive version of the basic idea where the amplifier 30 is not used, as shown in FIG. 3. The perfomance would be limited, however, because of increased component interaction. The function of the components in FIG. 3 are similar to the function of the components in FIG. 2 having the same reference characters. In this version, however, capacitor C is connected to ground, rather than to the output as in FIG. 2, and the output signal will appear at point 29 where the amplifier summing function was in the other version. The performance of the passive version is limited by increased component interaction and a higher output impedance, thus the active version of FIG. 2 is perferable.

Obviously, many modifications and variations of the present invention are possible in the light of the above teachings. It is therefore to be understood that within the scope of the appended cliams the invetion may be practiced otherwise than as specifically described.

What is claimed is:

1. An active single loop filter network with multiple inputs which operates under multiple signal control for accommodating a plurality of different and independent bandwidth input signals comprising:

a. an operational amplifier having a single feedback loop;

b. a plurality of feedback damping resistors connected in series for presenting various and independent damping factors in said single feedback loop associated with different input bandwidths;

c. a single feedback capacitor connected in said feedback loop in series with said damping resistors;

d. a plurality of signal inputs;

e. a plurality of input resistors each connected between a respective one of said signal inputs and a respective one of said damping resistors, each separate said input resistor connected in series with a respective one of said damping resistors such that each successive input resistor is also connected in series with all preceding feedback damping resistors and said feedback capacitor for permitting a corresponding plurality of different input and independent loop filter bandwidths to be accommodated for multiple signal control, said damping resistors maintaining the desired damping factor for each corresponding input respectively.

2. A single loop filter network with multiple inputs which operates under multiple signal control for accommodating a plurality of different and independent bandwidth input signals, comprising:

a. a plurality of damping resistors connected in series for presenting various and separate damping factors in said single loop network associated with different input bandwidths;

b. a capacitor in said single loop network connected in series between said damping resistors and ground;

c. a plurality of signal inputs;

d. a plurality of input resistors each connected between a respective one of said signal inputs and a respective one of said damping resistors, each separate said input resistor connected in series with a respective one of said damping resistors such that each successive input resistor is also connected in series with all preceding damping resistors and said series capacitor for permitting a corresponding plurality of different input and loop filter bandwidths to be accommodated for multiple signal control, said damping resistors maintaining the desired damping factor for each corresponding input respectively.

* * * * *